Feb. 5, 1963 E. U. LANG 3,076,617
CUT-OFF MECHANISM FOR TIRE BEAD BUILDING MACHINE
Filed May 25, 1959
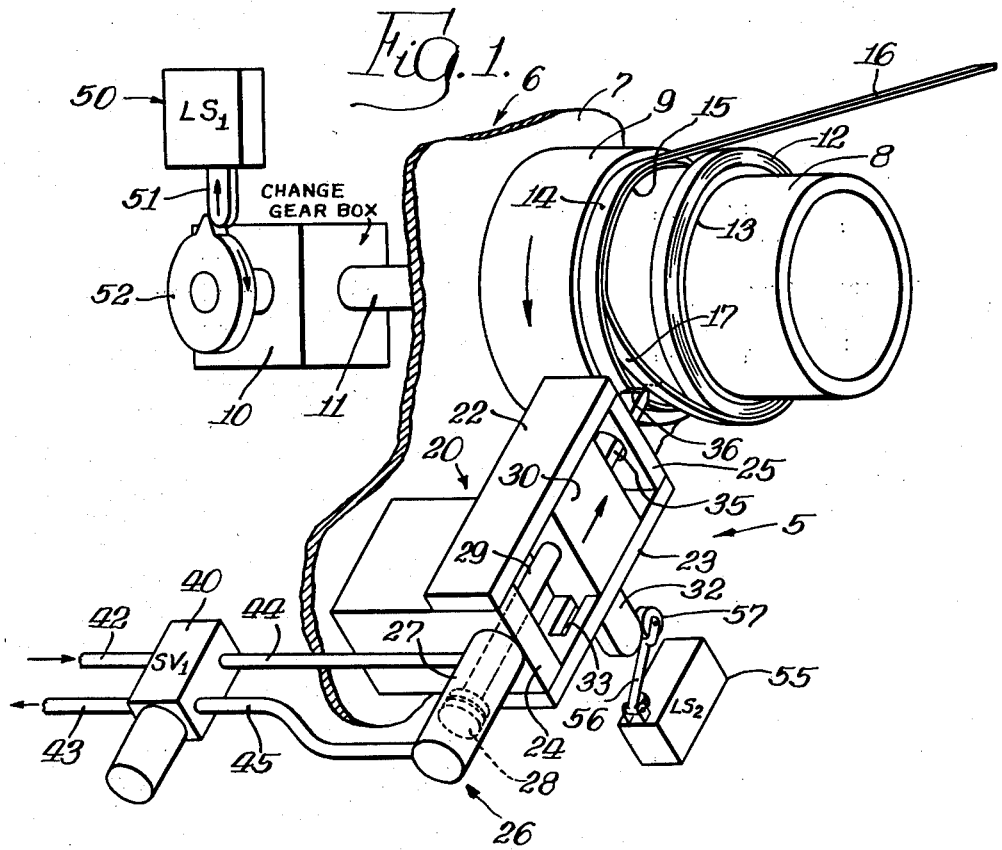
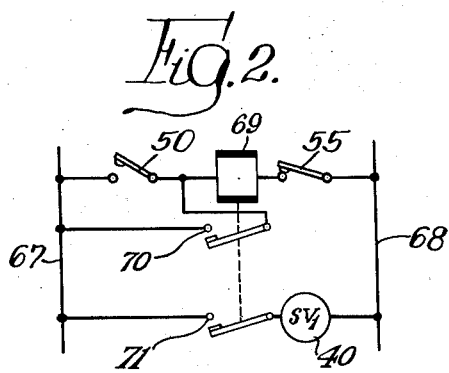
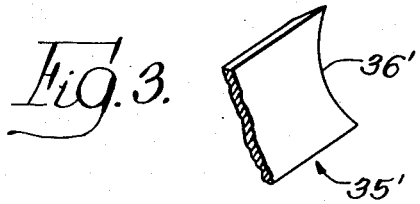
INVENTOR.
Ernest U. Lang,

United States Patent Office 3,076,617
Patented Feb. 5, 1963

3,076,617
CUT-OFF MECHANISM FOR TIRE BEAD BUILDING MACHINE
Ernest U. Lang, Niles, Mich., assignor to National-Standard Company, Niles, Mich., a corporation of Delaware
Filed May 25, 1959, Ser. No. 815,437
3 Claims. (Cl. 242—56)

My present invention relates to cut-off mechanism for severing tire bead material extending between a completed tire bead on the former of a tire bead building machine and the next succeeding bead on the former.

In the copending application of John W. White, Serial No. 790,532, filed February 2, 1959, now Patent No. 3,016,322, dated January 9, 1962, owned by the assignee of my present application, there is disclosed a tire bead building machine in which tire bead material is laid by suitable bead material laying means on a rotating former at a bead starting position for winding in superposed convolutions around the former, and before completion of the tire bead, the wound material on the former at the bead starting position is moved by positioning means axially of and on the former together with the bead material laying means to a bead finishing position. Upon completion of the bead at the bead finishing position of the desired number of complete or partial convolutions of tire bead material, the positioning means and bead material laying means are moved conjointly relative to the former to the bead starting position to begin the construction of the succeeding bead, and for which the preceding completed bead serves as an anchor for effecting initial winding of tire bead material around the former at the bead starting position thereon for such succeeding bead. Thus in the machine referred to, a cross-over portion of tire bead material extends on the outer surface of the former from the previously completed bead to the succeeding bead which cross-over material must be severed to separate the beads from each other. In the patent above mentioned, cut-off means is provided and operated in timed relation to afford severing the cross-over tire bead material after the tire bead material is sufficiently anchored to the former at the bead starting position on the former for the satisfactory construction of a bead as above related. The patent mentioned discloses cut-off means in the form of an abrasive wheel pivotally movable inwardly and outwardly relative to the former to sever the cross-over material in appropriate timed relation to the formation of tire beads on the former, and my present invention is concerned with an improvement in such cut-off means.

It is an object of my present invention to provide a new and novel cut-off mechanism for severing of tire bead material between successively constructed beads on a former of a tire bead building machine.

A further object of my invention is to provide cut-off mechanism including cutting means having a cutting edge, and which cutting means is reciprocated toward and away from the surface of the former in timed relation with respect to the rotation thereof to sever cross-over bead material on the former as aforedescribed.

A further object is to provide cutting means as aforementioned having a straight cutting edge extending parallel with the axis of rotation of the former and adapted to be positioned between the bead starting and bead finishing positions of the former, so that the outer surface on which the cross-over bead material lies serves as an anvil to effect cutting of the cross-over bead material by the cutting edge of the cutting means.

A further object is to provide cutting means having a curved cutting edge of a configuration conforming to the outer surface of the former between its bead starting and bead finishing positions to effect, upon movement of the cutting member toward the former, severing of the cross-over bead material between the curved cutting edge of the cutting means and the outer surface of the former.

The above and other objects and advantages of my invention will appear from the following detail description of a preferred embodiment of my invention.

Now in order to acquaint those skilled in the art with the manner of constructing and utilizing a cut-off mechanism for a tire bead building machine in accordance with the principles of my present invention, I shall describe in connection with the accompanying drawings a preferred form of cut-off mechanism of my invention.

In the drawings:

FIGURE 1 is a perspective view largely diagrammatic illustrating a cut-off mechanism constructed in accordance with the principles of my present invention;

FIGURE 2 is a circuit diagram of the control means for the cut-off mechanism illustrated in FIGURE 1; and FIGURE 3 is a detail view of the cutting edge of a modified form of cutting means of my invention.

As previously related the cut-off mechanism of my present invention, generally illustrated in FIGURE 1 by the reference numeral 5, is associated with a known tire bead building machine which is shown and described in the aforementioned Patent No. 3,016,322 and of which only certain essential components for an understanding of my invention are diagrammatically shown in FIGURE 1, and illustrated generally at 6. In this regard the tire building machine comprises a suitable supporting frame structure indicated at 7, a rotatable cylindrical former 8, bead material positioning means or collar 9, and drive means 10 which, in the particular illustration shown in FIGURE 1 includes a change gear box from which a shaft 11 projects for suitable connection with the former 8 and collar 9 to effect rotation of the latter. In the drawing, a completed tire bead 12 is shown at bead finishing position 13 on the cylindrical outer surface of the former, and a succeeding bead 14 is under construction at a bead starting position 15 spaced axially on the outer cylindrical surface of the former relative to bead finishing position 13. It will be observed that at bead starting position 15, tire bead material 16 is being wound in successive convolutions about the former at the outer shoulder of the collar 9, and that cross-over bead material shown at 17 extends from the outer convolution of completed bead 12 at bead finishing position 13 to the inner convolution of the succeeding bead 14 at the bead starting position 15. In the particular construction of tire bead machine shown, the bead material wound at the bead starting position 15 is about to be advanced axially on the outer cylindrical surface of the former toward the bead finishing position 13 and just subsequent to actuation of the cut-off mechanism 5 for severing the cross-over bead material 17 during rotation of the former. The cut-off mechansm 5 may be actuated to sever cross-over material 17 after at least one convolution of tire bead material has been wrapped around the former at bead starting position 15 and before collar 9 is advanced axially on the former toward the bead finishing position. The tire bead material at bead starting position 15 should preferably constitute a full convolution to assure adequate anchoring of the tire bead material for the bead under construction thereat before severing of the cross-over material. In the bead machine, the cut-off mechanism 5 is suitably actuated, as will be described, to sever the cross-over material 17, and means, not shown, then advances collar 9 axially toward the outer end of the former, together with means (not shown) for laying the tire bead material so that as the bead material wound at the bead starting position 15 is advanced on the former, bead material from a supply is continued to be laid in superposed convolutions to completion of the bead at the bead finishing position 13. Thereafter collar 9 and the bead material laying mechanism are quickly conjointly retracted laying cross-over bead material as at 17 on the outer surface of the former from the outer convolution of the completed bead at bead finishing position 13 to the inner convolution of the succeeding bead at the bead starting position 15. It is believed that the above description of a tire bead machine for purposes of the present invention is sufficient for a full and complete understanding of my invention, and as previously indicated further detail information in regard to one suitable form of the bead machine to which my invention has application is incorporated herein by reference to the copending application of John W. White, Serial No. 790,532, filed February 2, 1959, now Patent No. 3,016,322, dated January 9, 1962, owned by the assignee of my present application.

Referring now to the cut-off mechanism 5 of my invention, it will be observed that it comprises suitable frame means indicated generally at 20, which may for convenience, be carried by the frame means 7 of the tire bead machine 6 in position to dispose the cut-off mechanism laterally of the former 8. The frame means 20 comprises suitable upper and lower walls 22 and 23 connected by end wall members 24 and 25 to provide for the support of a piston and cylinder assembly, indicated generally at 26, and in which cylinder means 27 is supported by the end frame member 24. Piston means indicated generally at 28 is mounted for reciprocation within the cylinder 27 on an axis transverse to the axis of rotation of and in a direction toward and away from former 8. Piston rod 29 of piston means 28 is connected with tripping means 30 suitably mounted for rectilinear sliding movement between the bottom walls 22 and 23. As shown, an arm 32 of tripping means 30 projects through an opening or slot 33 in the bottom wall 23 of the frame means. The arm 32 is preferably adjustable to adjust as desired the extent of its projection through opening or slot 33. The tripping means 30 carries cutting means in the form of a bar or chisel 35 which at its end facing the former 8 is provided with a straight line cutting edge 36 extending parallel with the axis of rotation of former 8. It will be seen that the frame assembly 20 is arranged with respect to the frame 7 of the bead machine so that the cutting edge 36 lies between the bead starting and bead finishing positions 15 and 13, respectively, of the former in a position for severing the cross-over bead material 17.

Suitable control means of the cut-off mechanism may comprise a known four-way solenoid valve 40 having connection with fluid lines 42 and 43 from a source of fluid under pressure (not shown) to control the passage of fluid through conduits 44 and 45, selectively, to the ends of cylinder 27 opposite ends of piston 28 to reciprocate the latter in the cylinder. The solenoid valve 40 is of known type, one suitable form of which is manufactured by Ross Operating Valve Co., and identified by it as Model 162 BA 02.

The control means for the cut-off mechanism further comprises switch means, indicated generally at 50, which may be of the type manufactured by Electro-Snap Switch and Manufacturing Co., and identified by it as Model No. ES 4 JM 1. As shown, the switch means 50 is normally open and includes an actuating plunger 51 which is adapted to be engaged by a cam 52 driven by drive means 10 for the former 8 for closing the same. The control means also includes second normally closed switch means, indicated generally at 55, having a spring loaded arm 56 carrying a roller 57 at its outer end adapted to be engaged by the depending finger 32 of the tripping means 30 to open the same. The switch 55 is also of known construction and one suitable form of such switch is sold by Minneapolis-Honeywell Co., identified by it as Model No. BZE 2 RQ 2.

Referring now to FIGURE 2 of the drawing, it will be observed that the switches 50 and 55 are arranged in series circuit relation between power input lines 67 and 68. A relay 69 having sets of contacts 70 and 71 is arranged with contacts 70 in parallel with switch 50 and contacts 71 in series with solenoid valve 40. In the circuit illustrated in FIGURE 2, it will be observed upon momentary closing of switch 50 by cam 52 that relay 69 is energized closing relay holding contacts 70 and closing contacts 71 completing a circuit through solenoid valve 40 which effects connection of fluid from a source of fluid under pressure through line 45 to cylinder 27 moving piston means 28, tripping means 30, and cutting means 35 conjointly in a direction inwardly and toward the former 8 to engage the cutting edge 36 with the cross-over bead material 17. The surface of the former 8 opposite cutting edge 36 serves as an anvil in effecting severing of the cross-over bead material. Upon the afore-said movement of the piston means 28 and cutting means 35 to effect severing of the cross-over bead material, the arm 32 of tripping means 30 engages switch 55 opening the same and conditioning the solenoid valve 40 to effect movement of the piston means 28 and cutting means 35 in a direction away from the former, and thus disposing the same in the starting position shown in the drawing for cutting the next succeeding cross-over bead material. It will be observed that the cam 52 driven from the change gear box of the drive means 11 for the bead machine makes one complete revolution in the fabricating of one complete bead, so that the cut-off mechanism is appropriately timed to sever the cross-over bead material between succeeding beads formed on a rotatable former as described.

In FIGURE 3 I have shown a modified form of cutting means 35' and it will be observed that it has a curved cutting edge 36' of a radius conforming to the radius of the outer cylindrical surface of a cylindrical former such as shown at 8. The cutting means 35' is securely mounted in tripping means 30 with its cutting edge 36' lying in a plane perpendicular to the axis of rotation of the former so that when the cutting member 35' is moved to its severing position, its cutting edge conforms to the cylindrical surface of the former between the bead starting and bead finishing positions 15 and 13, respectively. The frame means 20 may be disposed as desired to cut the cross-over bead material 17 at any position between the bead starting and bead finishing positions on the former.

While I have described a preferred embodiment of my invention, it will be understood that various modifications and rearrangements may be made therein without departing from the spirit and scope of my invention.

I claim:

1. In a cut-off mechanism for a tire bead building machine characterized by having a former mounted for rotation about a fixed axis, in which said former has bead starting and bead finishing positions on the periphery thereof spaced apart lengthwise of the axis of rotation of the same, and between which positions cross-over bead material is adapted to extend on an intermediate portion of said former between bead material at said bead finishing and starting positions, and by having drive means for rotating said former about its axis of rotation, the combination of mounting means disposed adjacent to and in fixed position axially of said former including cylinder means, and piston means mounted in said cylinder means for reciprocation toward and away from said intermediate portion of said former on a fixed axis transverse to the axis of rotation of said former, a cutting member connected to said piston means for movement therewith and having a cutting edge facing said intermediate portion of said former, said intermediate portion of said former providing an anvil for said cutting edge, valve means for admitting fluid under pressure to said cylinder means to reciprocate said piston means therein, means associated with said drive means for said former for controlling actuation of said valve means to admit fluid under pressure to said cylinder means to move said piston means and said cutting member toward said intermediate portion of said former in timed relation to rotation of the latter to effect severing of said cross-over bead material at said intermediate portion of said former by said cutting edge of said cutting member, and means associated with said piston means for actuating said valve means to admit fluid under pressure to said cylinder means to move said piston means and said cutting member away from said intermediate portion of said former.

2. In a cut-off mechanism for a tire bead building machine characterized by having a former mounted for rotation about a fixed axis, in which said former has bead starting and bead finishing positions on the periphery thereof spaced apart lengthwise of the axis of rotation of the same, and between which positions cross-over bead material is adapted to extend on an intermediate portion of said former between bead material at said bead finishing and starting positions, and by having drive means for rotating said former about its axis of rotation, the combination of mounting means comprising frame means mounted laterally and in fixed position axially of said former, cylinder means carried by said frame means, piston means mounted for reciprocation in said cylinder means toward and away from said intermediate portion of said former on a fixed axis transverse to the axis of rotation of said former, a cutting member connected with said piston means for movement therewith, a tripping member movable with said piston means and said cutting member, said cutting member having a cutting edge facing said intermdiate portion of said former, said intermediate portion of said former providing an anvil for said cutting edge, solenoid valve means for controlling flow of fluid to said cylinder means to reciprocate said piston means therein, first switch means associated with said drive means for said former for controlling said solenoid valve means to effect movement of said piston means and said cutting member toward said intermediate portion of said former in timed relation to rotation of the latter to effect severing of said cross-over bead material at said intermediate portion of said former by said cutting edge of said cutting member, and second switch means adapted to be actuated by said tripping member for controlling said solenoid valve means to effect movement of said piston means and said cutting member away from said intermediate portion of said former.

3. In a cut-off mechanism for a tire bead building machine characterized by having a former mounted for rotation about a fixed axis, in which said former has bead starting and bead finishing positions on the periphery thereof spaced apart lengthwise of the axis of rotation of the same, and between which positions cross-over bead material is adapted to extend on an intermediate portion of said former between bead material at said bead finishing and starting positions, and by having drive means for rotating said former about its axis of rotation, the combination of mounting means comprising frame means mounted laterally and in fixed position axially of said former, cylinder means carried by said frame means, piston means mounted for reciprocation in said cylinder means toward and away from said intermediate portion of said former on a fixed axis transversely to the axis of rotation of said former, a cutting member connected with said piston means for movement therewith, a tripping member movable with said piston means and said cutting member, said cutting member having a cutting edge facing said intermediate portion of said former, said intermediate portion of said former providing an anvil for said cutting edge, control means comprising circuit means including solenoid valve means for controlling flow of fluid to said cylinder means to effect movement of said piston means and said cutting member toward and away from said intermediate portion of said former, first switch means adapted to be momentarily closed by said drive means in timed relation to rotation of said former to energize said circuit means, relay means energized by closing of said first switch means for maintaining said circuit means closed to actuate said solenoid valve means to effect movement of said piston means and said cutting means toward said intermediate portion of said former to sever the cross-over bead material, and second switch means in said circuit means adapted to be actuated by said tripping means to de-energize said solenoid valve means to afford movement of said piston means and said cutting member away from said intermediate portion of said former.

References Cited in the file of this patent
UNITED STATES PATENTS

| | | |
|---|---|---|
| 1,626,915 | Buffington | May 3, 1927 |
| 1,738,018 | Pfeiffer | Dec. 3, 1929 |
| 1,927,811 | Stevens | Sept. 19, 1933 |
| 1,957,981 | Shook | May 8, 1934 |
| 2,334,577 | Postlewaite | Nov. 16, 1943 |
| 2,688,346 | England | Sept. 7, 1954 |
| 2,779,407 | Thomsen | Jan. 29, 1957 |